United States Patent [19]
Boehringer et al.

[11] Patent Number: 5,806,806
[45] Date of Patent: Sep. 15, 1998

[54] FLIGHT CONTROL MECHANICAL BACKUP SYSTEM

[75] Inventors: Wilfred E. Boehringer, Fullerton; Teunes Verhoeven, Long Beach, both of Calif.

[73] Assignee: McDonnell Douglas Corporation, St. Louis, Mo.

[21] Appl. No.: 611,982

[22] Filed: Mar. 4, 1996

[51] Int. Cl.$^6$ ............................................. B64C 13/22
[52] U.S. Cl. ............................................. 244/196
[58] Field of Search .................... 244/196, 197, 244/194, 195, 221, 223, 224, 226, 227, 228

[56] References Cited

U.S. PATENT DOCUMENTS

| | | | |
|---|---|---|---|
| 4,004,537 | 1/1977 | Nilsson | 244/228 |
| 4,079,902 | 3/1978 | Ryzhko et al. | |
| 4,171,113 | 10/1979 | Townsend | 244/221 |
| 4,198,017 | 4/1980 | Murray | 244/221 |
| 4,472,780 | 9/1984 | Chenoweth et al. | |
| 4,759,515 | 7/1988 | Carl | |
| 4,762,294 | 8/1988 | Carl | |
| 4,765,568 | 8/1988 | Carl et al. | |
| 4,793,576 | 12/1988 | Frerk | |
| 4,964,599 | 10/1990 | Farineau | |
| 5,456,428 | 10/1995 | Hegg | |

Primary Examiner—Galen L. Barefoot
Attorney, Agent, or Firm—Bell Seltzer Intellectual Property Law Group of Alston & Bird LLP

[57] ABSTRACT

A robust mechanical reversion system which provides the ability to fly and land in the absence of any fly-by-wire controls and which is transparent to the pilot during normal operation. The described invention provides a mechanism which includes redundant linear variable differential transmitters (LVDT) which generates a transmitted signal in proportion to the displacement of the control apparatus in the cockpit. The signal is fed to the flight control computer which determines the magnitude of the change represented by the signal and in turn, commands both the control surface servo actuators as well as an electrical mechanical servo actuator (EMA) located in close proximity to the flight compartment and coupled to the mechanical system to move in proportion to the change.

An Electromagnetic Actuator drives the disconnected mechanical system in synchronization with the position of the cockpit controls in the fly-by-wire mode for a given control surface each time the servo actuator(s) for the control surface are electrically commanded by the flight computer. This causes the mechanical system to remain in phase with the position of the control elements as if connected thereto. In the event of a failure of the fly-by-wire system the mechanical system is automatically coupled into the control system through locking actuators which release a coupling mechanism including a interlocking pin, locking cams, clutch or other engagement device and clamps or locks the pilots input to the mechanical control loop thus providing direct mechanical control to the surface actuators with very little transient effects.

25 Claims, 8 Drawing Sheets

FLIGHT CONTROL MECHANICAL BACKUP SYSTEM

BACKGROUND OF THE INVENTION

1. Field of the Invention

This invention relates to commercial transport fly-by-wire flight control systems which employ mechanical backups. More specifically, this invention relates to a fly-by-wire flight control system which includes a powerful mechanical reversion mode which imparts minimum transients to the control mechanism when engaged.

2. Related Art

The term "fly-by-wire" as used herein is the name given to a control system in which control commands of a pilot are transformed into electrical signals which are transmitted to actuators which are connected to the control surfaces. The term "control surfaces" refers to movable aerodynamic surfaces which are operable for control of the aircraft to enable pitch roll and yaw maneuvers of the aircraft and in some cases a change in the aerodynamic characteristics of the air foil.

Safety is a major concern within the aircraft industry and within the regulatory agencies. Certain statistical criteria are presented in FAR regulations to mandate the minimum safety requirements of various redundant systems used in aircraft. Many contemporary commercial transport planes use electrically signaled primary flight control systems, commonly referred to as "fly-by-wire" flight controls. Such fly-by-wire systems have multiple computer systems, with some form of mechanical backup. This mechanical backup was included to provide very limited aircraft control in emergency situations when the fly-by-wire system is lost for whatever reason, i.e., electrical loss, software anomalies, power failure, etc. The purpose of such mechanical backup was to provide short term aircraft control until the electrical or computer problem could be resolved and the fly-by-wire control system re-established. Such mechanical systems were not, however, configured to provide acceptable control for all phases of flight, i.e., landing, go around, or other necessary maneuvers.

In any mechanical reversion system, it is highly desirable to provide a mechanical configuration which makes the existence of the mechanical system transparent to the pilot during the normal fly-by-wire mode and which minimizes any effects of the reversion transient when the mechanical mode is engaged. Accordingly, the prior systems have employed weak mechanical control systems which use a single surface in at least two of the three primary axes to provide minimum aircraft control, these surfaces generally being different surfaces than those controlled electrically via the computers. When an anomaly occurs with the electrical command (electrical power loss, software glitch, etc.) the system continues in the mechanical command state, where the pilot commands directly move the limited mechanical system to operate the desired flight control surfaces.

The instant invention provides a more powerful mechanical reversion mode which can provide sufficient control to allow the aircraft to continue safe flight and landing and during virtually all other phases of flight, it is transparent to the pilot while in the fly-by-wire mode yet provides minimum transient effects on reversion.

SUMMARY OF THE INVENTION

In any mechanical reversion system which remains uncoupled until a failure, there is an upset transient or aircraft upset during a reversion from a fly-by-wire system to the mechanical system. This occurs because the mechanical system is most often in a standby mode and awaits engagement on failure of the primary fly-by-wire control system at a fixed position. Thus when such a system is engaged there is a good possibility that the control surfaces will be out of phase with the mechanical system. If the mechanical system then resets the control surface to the position of the mechanical system, unexpected aircraft movement can take place. The more robust the mechanical system the more difficulty is encountered by the pilot in overcoming the upset and restoring control of the aircraft.

If the mechanical system remains engaged in order to avoid upset, the pilot will encounter unacceptable feel of the controls due to the mechanical system and the attributes of the fly-by-wire system will be compromised.

The instant system provides a robust mechanical reversion system which provides the ability to fly and land in the absence of any fly-by-wire controls. During the fly-by-wire mode also known as, "hands on flying," the mechanical system of the instant invention, even though robust, is transparent to the pilot while providing the aircraft with an additional level of safety over the existing fly-by-wire technology and current mechanical backup systems. The described invention provides a mechanism which includes redundant linear variable differential transmitters (LVDT) which change transmitted signal in proportion to the displacement of the control apparatus in the cockpit. The signal is fed to the flight control computer which determines the magnitude of the change represented by the signal and in turn, commands both the control surface servo actuators as well as an electrical mechanical servo actuator (EMA) located in close proximity to the flight compartment and coupled to the mechanical system to move in proportion to the change.

Accordingly, the EMA drives the mechanical system in synchronization with the position of the cockpit controls in the fly-by-wire mode for a given control surface each time the servo actuator(s) for the control surface are electrically commanded by the flight computer. This causes the mechanical system to remain in phase with the position of the control elements as if connected thereto. Since the mechanical system is uncoupled from the control surface servo(s), during the fly-by-wire mode, no mechanical input influences the control surface servo or the control surface position. In the event of a failure of the fly-by-wire system the mechanical system is automatically coupled into the control system. Since the mechanical system position is continuously moved in phase with the control surface actuators negligible reversion occurs, upon mechanical engagement, because the control surface position at the instant of reversion, is substantially where it would have been had the mechanical system been continuously engaged. A small amount of freedom is required between the pilot's mechanical input into the fly-by-wire system and the motion of the EMA driven mechanical loop. This freedom band (limited mechanical freeplay) is present during the fly-by wire mode and is removed (clamped) during the mechanical reversion mode. The mechanical freedom band minimizes an objectionable control feel (nibble) during the fly-by-wire mode. In other words, during the fly-by-wire mode, the pilot commands mechanically move a downstream mechanism with a small amount of free play. While in the fly-by-wire mode, the flight control computer commands the EMA driven downstream mechanical system to maintain a position in the center of a freedom band, thereby chasing the pilot's mechanical input with the EMA input.

The in phase nature of the instant mechanical system, isolates the pilot from the mechanical system yet keeps it in close phase related position to the actual position of the control surface as though the mechanical system were engaged. During mechanical reversion, the freedom band is closed by elimination or loss of power to the locking actuator. When this occurs the locking actuator releases a coupling mechanism such as a interlocking pin, locking cams, clutch or other engagement device and clamps or locks the pilot's input to the mechanical control loop thus providing direct mechanical control to the surface actuators with very little transient effects. Some increase in control breakout load may be experienced. At least two axes are configured with the mechanical reversion loop. The elevators for pitch control are always required with a choice between rudder or ailerons for direction control, aileron control being preferable.

During the fly-by-wire mode, the mechanical input to the flight control surface actuators remains uncoupled. That is, the mechanical system remains uncoupled at the surface actuators because power is applied to the reversion actuators. During auto pilot mode these reversion actuators, at the surface, are also in the uncoupled state. Also, the coupling actuators for engagement of the EMA actuator near the cockpit controls, are coupled to provide motion to the surface actuator mechanical loop and to backdrive the controls in the cockpit. This provides the pilot with visual cues as to the action of the autopilot and control surface positions, during the autoland phase of flight with the autopilot engaged only.

During full mechanical reversion such as in emergency situations, the mechanical system is coupled to provide front driving from the cockpit controls for the various control surfaces through the control surface actuators. As noted above, not all control surfaces need mechanical reversion to adequately control the aircraft.

The EMA actuator (up front) also provides additional functions, eg. the flight computer may be programmed to provide commands to the EMA which impart a variable load feel to the pilot. There is a normal fixed load feel, but as conditions change, such as attitude, forces on the aircraft, speed, etc., a variable load feel can be electrically controlled by commands from the computer to provide feedback to the pilot on these changing conditions. This would appear, for example, in the form of greater or lesser effort required to move the control column or other control apparatus dependent upon the forces introduced on the aircraft due to speed, as well as other flight conditions.

The specific features in the disclosed system include the system that is employed in maintaining the mechanical loop and the electrical loop in close phase, and the method of the configuring of the mechanical system to prevent adverse feel to the pilot in the fly-by-wire mode.

DESCRIPTION OF THE PREFERRED EMBODIMENTS

Figure 1:
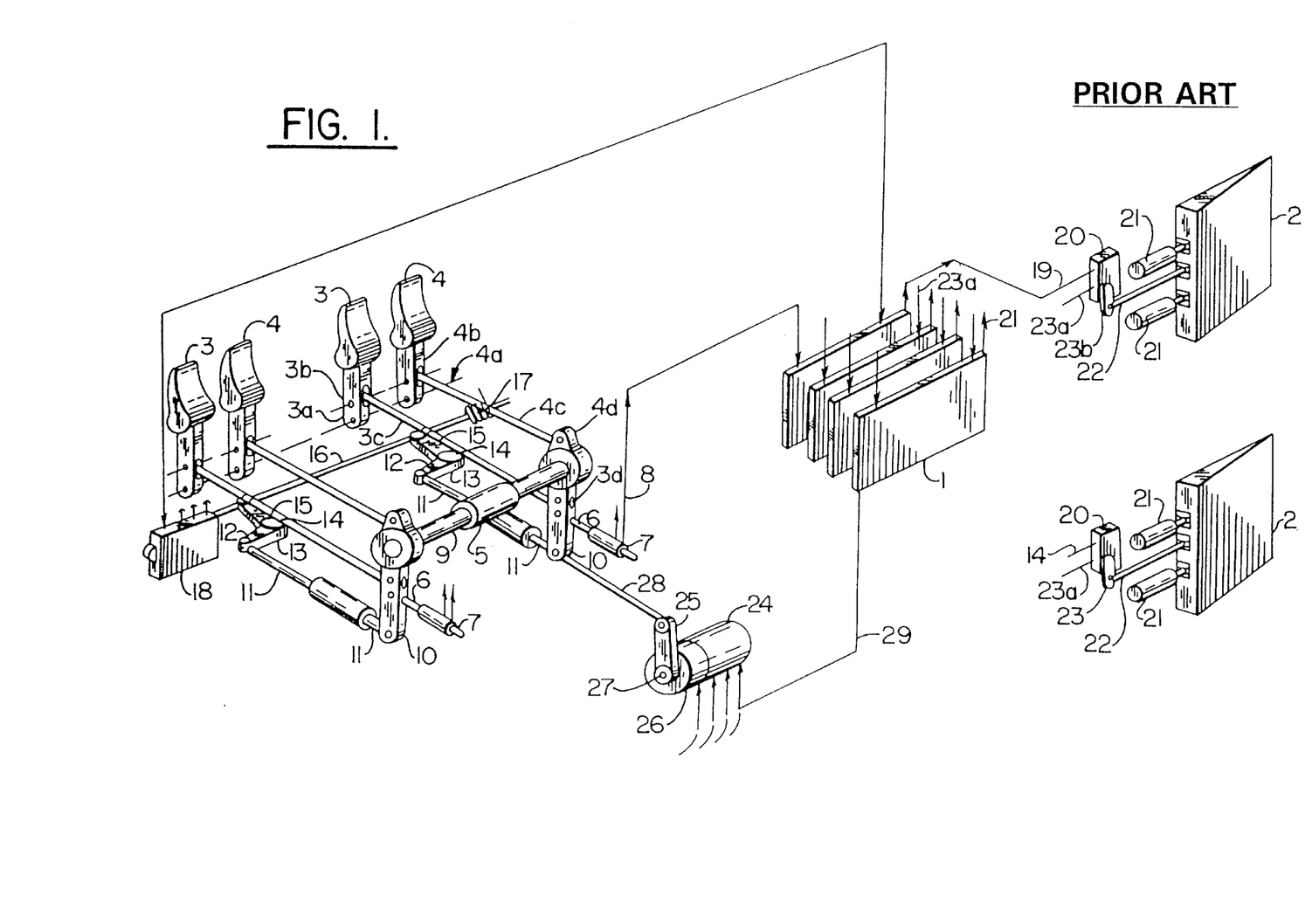
FIG. 1 is a schematic view of a directional control system interconnected to the programmed flight computers.

The present invention as shown in the drawings comprises an apparatus for controlling the positioning of a mechanical control system substantially in phase with control elements of a fly-by-wire or electrical control system. Fly-by-wire control systems are used to operate actuators for pitch, yaw and roll maneuvers. The pitch actuator(s) operate the elevators, the roll actuators operate the ailerons and the yaw actuators operate the rudder. With reference to the figures, FIG. 1 shows a schematic of a typical fly-by-wire directional control system without manual reversion for operation of the rudder 2. Such a system is operated by rudder pedals 3 and 4 as shown in the directional control system of FIG. 1. Two rudder pedal pairs are shown, one for the pilot and one for the co-pilot respectively which operate in parallel unless an override 5 disconnects the same. In this particular control system, there are multiple flight control computers 1 for redundancy. Each can provide control over a particular aircraft axis when the then active computer system fails. Since the operation of aircraft computer systems are well known, description of their operation is omitted. The rudder pedals 3 and 4 rotate about axes 3a and 4a respectively. Depression of pedal 3 causes crank arm 10 to rotate in one direction and depression of pedal 4 causes crank arm 10 to rotate in the other direction. Pedal 3 motion drives linkage 3c which links pedal 3 and crank arm 10 at pivot points 3a and 3d. Similarly, pedal 4 motion drives linkage 4c which links pedal 4 and crank arm 10 at pivot points 4a and 4d. Linkage 3c is rotatably attached to crank arm 10 above the torque tube 9 and linkage 4c is rotatably attached to crank arm 10 below the torque tube. Pivot points 3d and 4d are spaced apart from the rotational axis of torque tube 9 such that moment arm about the rotational axis of torque tube 9 is equal but in opposite directions. Linkages 3c and 4c are so attached between pivot points 3a and 3d and 4a and 4d so that equal angular rotation is achieved by the respective pedals 3 and 4 as is known in the art. Appropriate linkage 6 interconnects the rudder pedals to a linear variable differential transmitter (LVDT) 7 for sensing the degree of rudder pedal deflection which is then communicated through electrical line 8 to the active flight control computer 1. The computer 1 then sends a signal through the then active electrical line 19 to the rudder control module 20 to cause the rudder 2 to rotate to the left or right as the case may be. The crank arms 10, are each rotatably connected to connecting rods 11 which are in turn rotatably connected to a first arm 12 of redundant bell cranks 13 each having an pivot point 14 about which each bell crank 13 rotates. The opposite arm 15 of bell crank 13 is rotatably connected to another connecting rod 16 which has a centering spring 17 on one end and is connected to a trim actuator control module 18 at the other. During autopilot and auto land modes, the computer 1 commands the trim actuator control module 18 to move the connecting rod 16 to set the pedal position to indicate the degree of trim set. When the flight computer 1 is operating in the fly-by-wire mode, the LVDT 7 senses the position of the crank arm 10 and sends a signal in proportion to the positive or negative angular displacement of the crank arm 10 to the flight computer 1. The flight computer 1 then sends command signals to the rudder control module 20 and activates the rudder actuator(s) 21 which causes the rudder 2 to rotate in the desired direction as described above. A mechanical feed back link 22 is rotatably connected to the rudder and a control feedback arm 23 on the rudder control module 20. Motion of the rudder causes the feedback arm 23 to rotate and causes control module 20 to generate a signal to the computer 1 on line 23*a* which is in proportion to the degree of rotation and signals the actual position of the rudder 2 (multiple rudder sections as shown in this particular schematic).

An Electromagnetic Actuator (EMA) 24 has a crank arm 25 fixedly attached to a clutch 26 on the rotor 27 of the EMA 25 at one end and rotatably connected to a connecting rod 28 at the other. The connecting rod 28 is rotatably attached to the crank arm 10 of the rudder pedal torque tube 9.

In the autopilot and autoland mode, the computer 1 engages the clutch 26 of the EMA 24 by providing power to the electromagnetic clutch 26, which has been held open by mechanical springs. This power directly couples the EMA 24 to the EMA crank arm 25. The connecting rod 28 is now driven by the EMA 24 in either direction in response to comnmands from flight computer 1. The flight computer 1 command causes the control pedals 3 and 4 to move as though there was a mechanical connection between the control pedals and the control surface and thereby provides visual cues for the pilot as to the positioning of the rudder 2.

Figure 2:
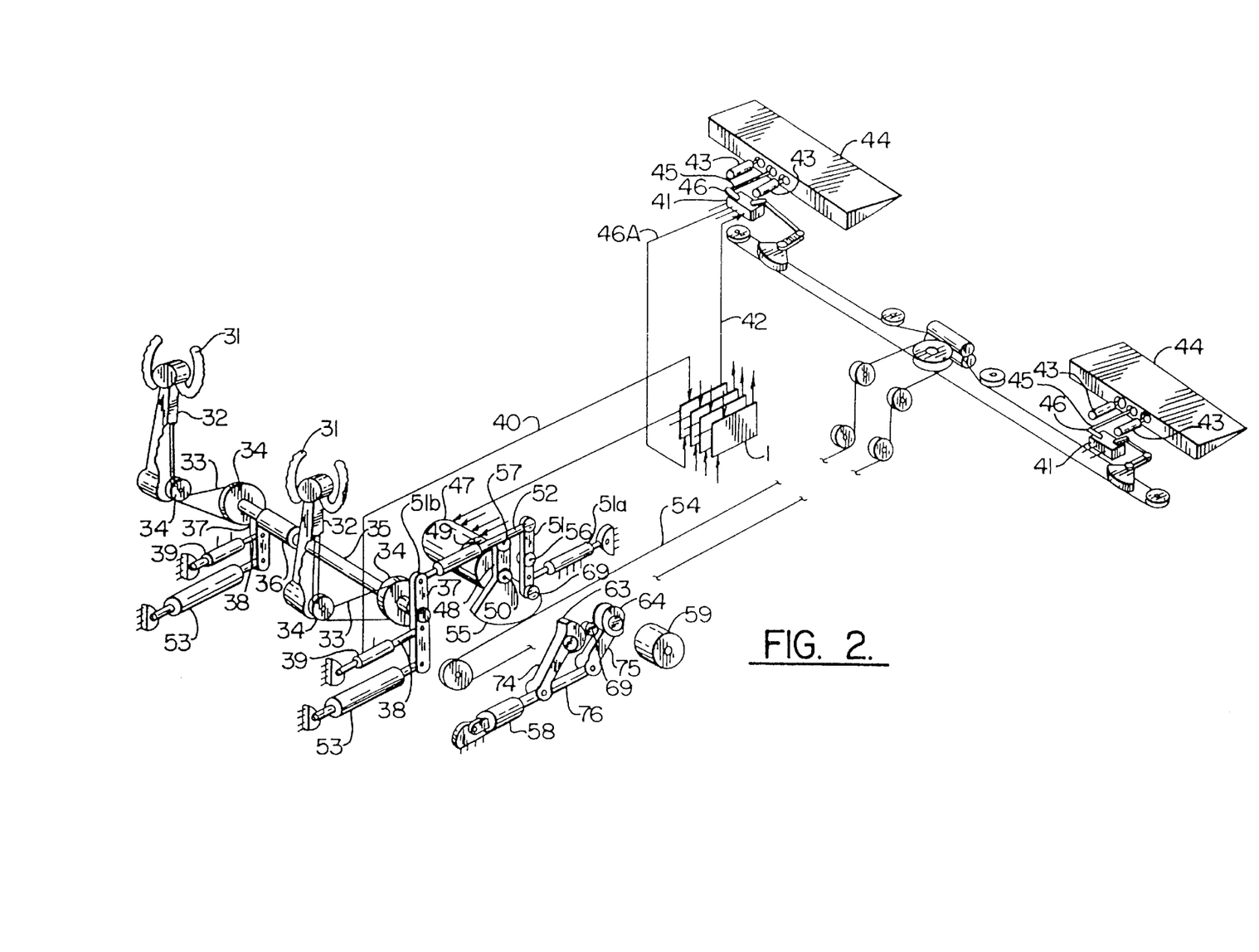
FIG. 2 is a schematic view of a lateral control system with the fly-by-wire interconnection to the aileron control systems and a schematic of the cable control system.

FIG. 2 shows the lateral control system for the ailerons including the electrical schematic and the cable schematic, as well known in the art. In the fly-by-wire mode, the ailerons 44 are driven by rotation of the wheel 31 on the control column 32 (two control columns are illustrated—one for the pilot and one for the copilot). Rotation of the wheel 31 transmits such rotation through control cables 33 and a series of pulleys 34 to a torque bar 35 which connects the two wheels 31 so that they operate in parallel unless an override 36 disconnects them. Torque bar 35 is provided with a pair of crank arms 37 each of which interconnect through linkage 38 to an LVDT 39. As with the rudder pedals each of the LVDT's 39 senses the degree of angular displacement of the crank arms 37 and transmit a signal in proportion to such displacement to the flight computer 1 through electrical line 40. The flight computer 1 then sends command signals to the aileron control module 41 through electrical lines 42 which activates the aileron actuator(s) 43 and causes the ailerons 44 to rotate in the desired direction. A mechanical feedback rod 45 is rotatably linked to the feedback crank 46 of the aileron control module 41. A signal is generated on movement of the feedback crank 46 in proportion to the movement and a signal is sent to the computer 1 through lines 46*a* indicating the actual position of the ailerons (the motion of the ailerons on opposite sides of the aircraft are in opposite directions).

As with the rudder control description, an Electromagnetic Actuator (EMA) 47 is provided which has a crank arm 48 fixedly attached to a clutch 49 on the rotor 50 of the EMA 47 at one end and rotatably connected to a sum bar 51 at the other. The connecting rod 52 is rotatably attached to the sum bar 51 at one end and to the crank arm 37 at the other. The crank arm 37 mechanically drives against a dual mechanical load feel 53. In this particular embodiment one crank arm 37 has been extended to provide a point for rotatably connecting the connecting rod 52 to said crank arm 37 at a point opposite the connection of the LVDT's 39. Any suitable connection which permits the conversion of rotational movement of the torque bar 35 to translational movement of the connecting rod 52 is considered within the scope of this invention.

In the autopilot and autoland mode, the computer 1 causes the clutch 49 of the EMA 47 to engage by providing power to the clutch 49. This directly couples the EMA 47 to the crank arm 48. In addition, the computer 1 causes the cam locking system to also be engaged by eliminating power to its actuator which causes the connecting rod 52 to be driven by the EMA 47 in either direction in response to commands from flight computer 1. In the autopilot mode, the flight computer 1 commands the EMA actuator 47 to cause the wheel 31 to rotate as though there was a mechanical connection between the wheel 31 and the ailerons 44 thereby providing visual cues for the pilot as to the positioning of the ailerons 44 during autopilot controlled flight.

However, during the fly-by-wire mode the cable system 54 remains disconnected from the wheel 31 so that no adverse control drag is felt except as introduced by the fly-by-wire system and any added artificial load feel devices then in use. In an alternative embodiment the mechanical or cable system may also be disconnected from the particular control surface actuators to lessen the force requirements for the control surface actuators. A locking actuator 59 is provided which holds the cable system in an unlocked position with a predetermined amount of freedom until power loss which connects the cable system to the cockpit controls thereby directly connecting the cable system 54 to the wheel 31 and providing direct mechanical control of the control surface from the cockpit.

While in the fly-by-wire mode, with the clutch 49 engaged, the flight computer 1 signals the EMA 47 to move as though connected to the control surface, this in turn causes the pulley section 55 to move back and forth along at least one of the cable sides. This positions the cable control system substantially in the same position as it would be in if directly connected with the cockpit controls. Thus when the mechanical system is engaged with the cockpit controls, little upset will be experienced by the aircraft, because the mechanical system will engage substantially in phase with the control surfaces and the cockpit controls.

The specific locking mechanism described includes a locking swivel as sum bar 51 which is rotatably attached at a central point to the top of the crank arm 48 of the EMA 47. When the cable of the mechanical system is moving in phase with the cockpit controls and the control surfaces, the locking sum bar 51 will idle, that is, remain disconnected, within a limited range of motion (freedom band), from the rotor 50 of the EMA 47 (A LVDT 51*a* coupled to computer 1 is connected to swivel bar 51 so that computer 1 may sense the position of the swivel bar 51 and ensure that it remains coupled to the EMA and the mechanical system). The swivel bar 51 prevents a direct connection between the cable system and the cockpit controls until locked. The locking sum bar 51 has a pivot point 56 which is aligned and connected with a corresponding pivot point 57 on the end of the crank arm 48. Pivot points 56 and 57 rotatably engage an axle (not shown) and in an emergency situation, eg. loss of power to the flight computers, the bias spring 58 will lock the sum bar 51 into alignment with the rotor 50 of the EMA 47 when the actuator 59 can no longer hold the locking cams open.

Figure 3:
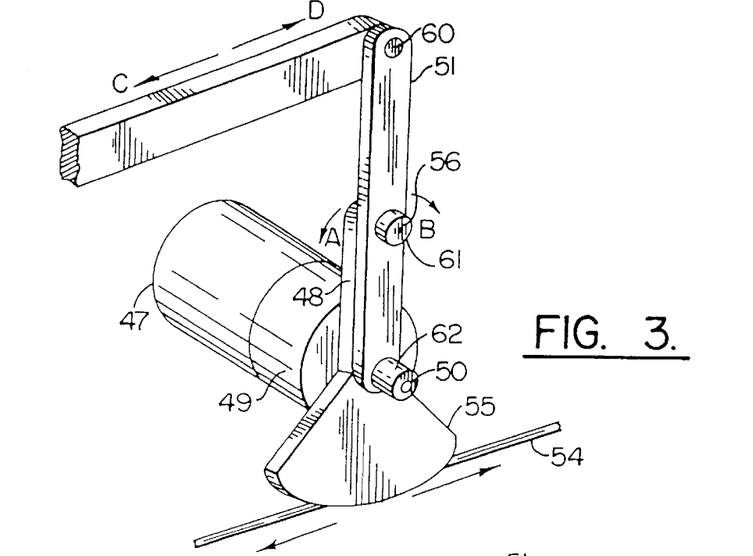
FIG. 3 is a perspective view of the EMA and the swivel bar.
Figure 4:
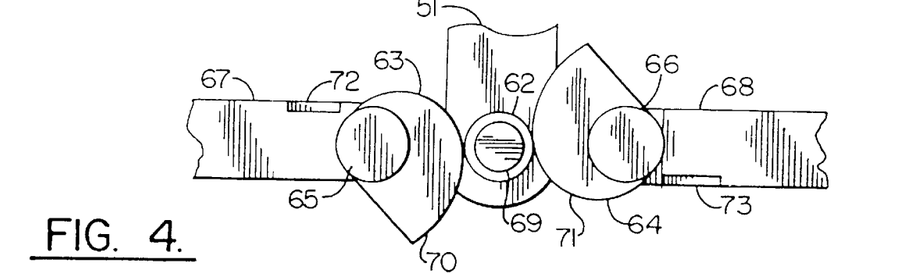
FIG. 4 is a front view of the locking apparatus with the cams in the locked position cams on the swivel bar.
Figure 5:
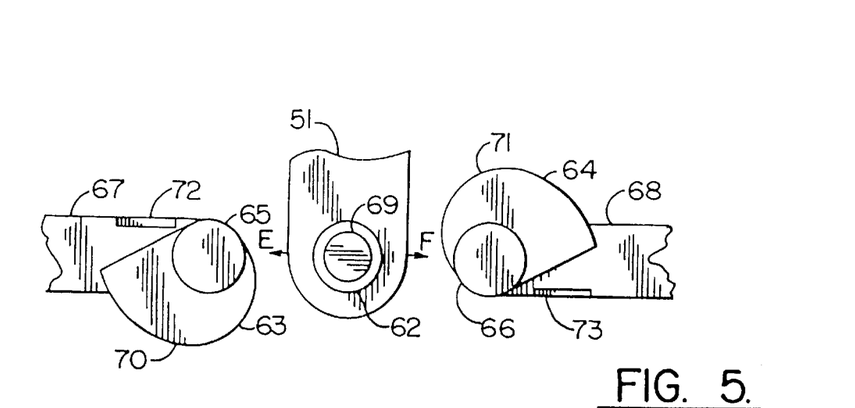
FIG. 5 is a front view of the locking apparatus with the cams in the unlocked position cams with the swivel bar.

FIGS. 3, 4 and 5 show these connections in greater detail. With reference to FIG. 3, the EMA 47 is shown with the clutch 49 engaged. As the EMA 47 rotates the crank arm 48 in the direction of A and B, the cable system 54 follows the pulley section 55 back and forth as pointed out before. As the cockpit controls are moved the connecting rod 52 moves in the direction of C and D and causes the sum bar 51 to move independently of the crank arm 48 within the limit of the freedom band, ie. between points E and F as shown on FIG. 5, and the pulley section 55 due to the interconnection of the sum bar 51 and crank arm 48 by an axle 61 through pivot point 56 about which the crank arm 48 and the sum bar 51 rotate. The sum bar 51 is rotatably attached to the connecting rod 52 by means of an axle 60 and rotates relative thereto. A sleeve 62 is on a pinion 69 attached at the opposite end of the sum bar 51 and is selectably engaged and disengaged by a pair of locking cams. In FIG. 4, the pinion 69 is shown with the sleeve or bearing 62 which rotates relative to the pinion 69 and directly engages the locking cams. FIGS. 4 and 5 show the locking cams in a locked and unlocked position respectively. Locking cams 63 and 64 are mounted to a pair of supports 67 and 68 which are mechanically grounded and the cams 63 and 64 are each mounted in typical fashion on a pair of axles 65 and 66 to permit rotation relative to supports 67 and 68. The cams 63 and 64 have curved sides 70 and 71 respectively with an increasing radius such that when biased in the locked position shown in FIG. 4 they engage the sleeve 62 with increasing force and restrain the lateral motion of the pinion 69 but permit rotation of the pinion 69 relative to the sleeve 62. The opposite side of each of the cams 63 and 64 have a flat surface which engages stops 72 and 73 respectively. When the locking cams 63 and 64 engage the pinion 69 and the sleeve 62, swivel motion of the sum bar 51 is prevented. The cams 63 and 64 are positioned so that when in the locked position, the central axis of the pinion 69 is aligned along the central axis of the rotor 50 of the EMA 47. In FIG. 5, the cams 63 and 64 are shown in an open or unlocked position and permit the lateral motion of the pinion 69, within the limit of the freedom band, in the E and F direction. This allows the sum bar 51 to swivel. This swiveling motion prevents connection of the cable system with the cockpit controls as described above.

Figure 6:
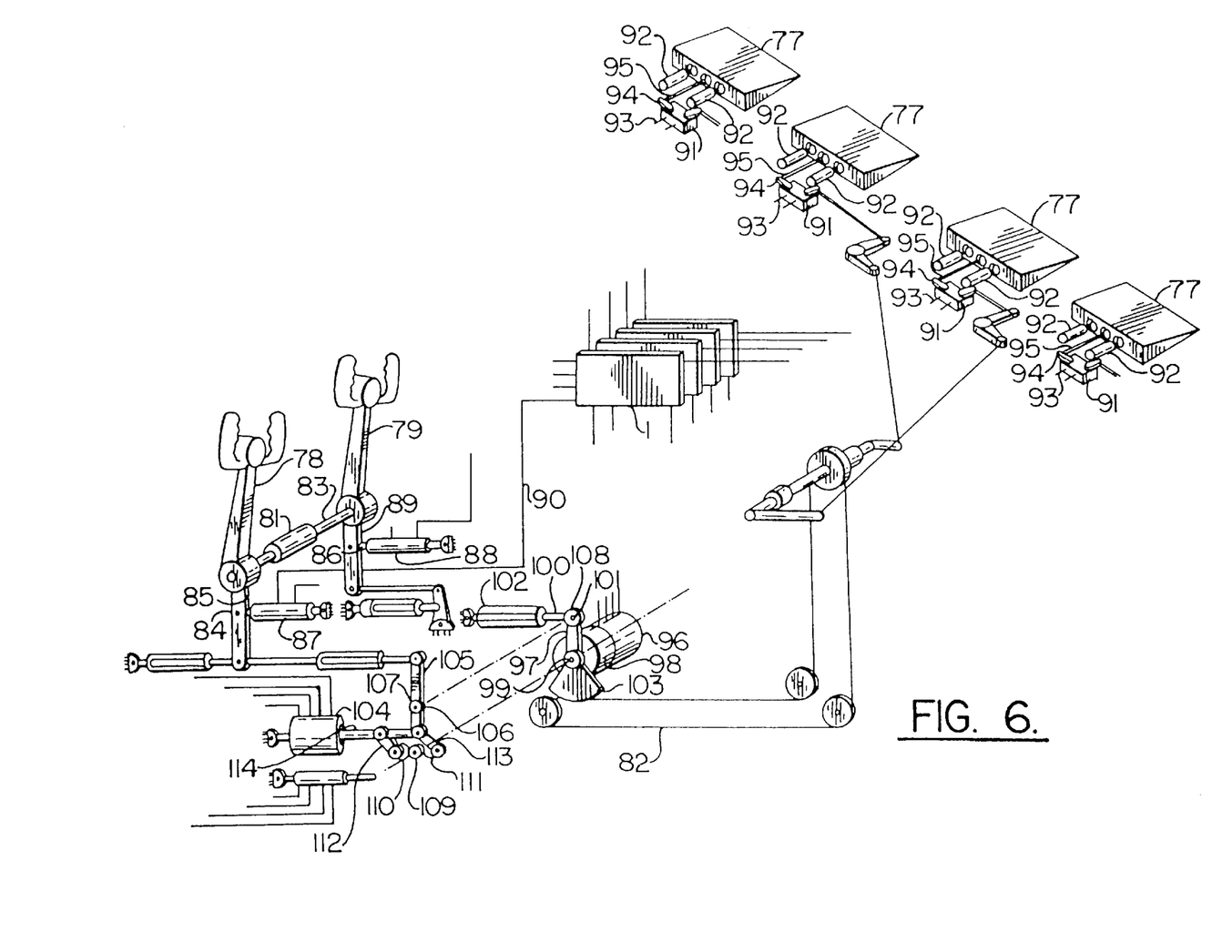
FIG. 6 is a schematic view of the pitch control system with a schematic of the cable control system interconnected with the elevators.

Referring again to FIG. 2, the pinion 69 is shown disposed between the cams 63 and 64. A pair of cam arms 74 and 75 are integral with cams 63 and 64 respectively at one end and rotatably attached to a connecting rod 76 at the other. A spring 58 biases the cams 63 and 64 in a closed or locked position. When in the fly-by-wire mode, the actuator 59 rotates the cams 63 and 64 into an open position. Rotation of cam 64 causes arm 75 to also swing into an open position and rotate relative to the connecting rod 76. This causes connecting rod 76 to translate horizontally and rotate the arm 74 of cam 63 causing cam 63 to also rotate into the open position. Actuator 59 must have sufficient torque or power to overcome the bias of spring 58. While a rotational actuator is shown, a solenoid or linear actuator could also be used for this purpose as is shown in FIG. 6. When power is lost in the fly-by-wire system, power to the actuator 59 is also lost and the bias spring 58 locks the sum bar 51 into position along radius of rotor 50. This locks the mechanical system into communication with the cockpit controls. The described system may be utilized to lock mechanical systems in phase to cockpit controls for any or all of the control surfaces and is not limited to the aileron control systems.

FIG. 6 shows the pitch control system for the elevators for both the electrical schematic and the cable schematic. In the fly-by-wire mode, the elevators 77 are driven by motion of the control columns 78 and 79. (two control columns are illustrated—one for the pilot and one for the copilot). Movement of either of the control columns 78 or 79 transmits such motion to a torque bar 83 which connects the two columns 78 and 79 so that they operate in parallel unless an override 81 is actuated. A cable system 82 is shown for backup and may be implemented through any convenient series of pulleys or other means. Torque bar 83 is provided with a pair of crank arms 84 and 89 each of which interconnect through linkage 85 and 86 to LVDTs 87 and 88 respectively. As with the rudder pedals each of the LVDTs 87 and 88 sense the degree of angular displacement of the crank arms 84 and transmit a signal in proportion to such displacement to the flight computer 1 over electrical line 90. The flight computer 1 then sends command signals to the elevator 77 control module 91 which activates the elevator actuator(s) 92 which causes the elevators 77 to rotate in the desired direction. A mechanical feed back rod 95 is connected to the control arm 94 of the elevator control module 91. A signal is generated on movement of the control arm 94 in proportion to the movement of the elevator control surface 77 and a signal is sent to the computer 1 indicating the actual position of the elevators.

An Electromagnetic Actuator (EMA) 96 has a crank arm 97 fixedly attached to a clutch 98 on the rotor 99 of the EMA 96 at one end and rotatably connected to a connecting rod 100 at an axle 101.

The connecting rod 100 is rotatably attached to ground through an artificial load feel device 102.

To avoid aircraft upset upon engagement of the described reversion mechanism, a pulley section 103 is provided which is connected to the EMA 96. While in the fly-by-wire mode, the flight computer 1 signals the EMA 96 to move the cable system 82 as though connected to the control surface, this in turn causes the pulley section 103 to move back and forth along at least one of the cable sides. In operation, the pulley section 103 is always driven by the rotor 99 of the EMA 96 in response to commands from the flight computer 1 which position the cable control system substantially in the same position as it would be in if directly connected to the cockpit controls. Thus when the mechanical system is engaged, little upset will be experienced by the aircraft because the mechanical system will engage substantially in phase with the control surfaces and the cockpit controls.

The cable system 82 is disconnected from the control columns 78 and 79 in the cockpit so that no adverse control drag is felt beyond that introduced by the fly-by-wire system and any added artificial load feel devices. Alternatively, the mechanical or cable system may also be disconnected from the particular control surface actuators. In the embodiment described in FIG. 6, a spring loaded locking solenoid 104 is provided which will rotate the cams as described before and on loss of electrical power lock the control columns 78 and 79 to the EMA 96 thereby directly connecting the cable system 82 with the control columns 78 and 79 thereby providing the direct mechanical control of the elevator control surface from the cockpit. The locking mechanism includes a locking sum bar 105 which is rotatably attached to the top of the crank arm 97 of the EMA 96 at a pivot point 107 as discussed with respect to the ailerons. When the cable of the mechanical system is moving in phase with the cockpit controls and the control surfaces, the locking sum bar 105 will idle that is remain disconnected within the limit of the freedom band from the rotor 99 of the EMA 96. This prevents a direct connection of the cable system to the cockpit controls. The locking swivel bar 105 has a pivot point 107 which is aligned with the end of the crank arm 97 and a corresponding pivot point 108. Pivot points 107 and 108 rotatably engage an axle not shown and in an emergency situation, eg. loss of power to the flight computers, the locking solenoid 104 will lock the locking sum bar 105 into alignment with the rotor 99 of the EMA 96 by action of an internal spring in the solenoid 104 when solenoid 104 loses power.

Referring again to FIG. 6, a pinion 109 is shown disposed between the cams 110 and 111. A pair of cam arms 112 and 113 are integral with cams 110 and 111 respectively at one end and rotatably attached to a connecting rod 114 at the other.

Solenoid 104 has an internal spring which biases the cams 110 and 111 in a closed or locked position. When in the fly-by-wire mode, the linear solenoid 104 is activated and biases the cams 110 and 111 into an open position by linearly translating the connecting rod 114 laterally to rotate the cams 110 and 111 into an open position. The solenoid 104 internal bias spring must have sufficient force to bias the cams into the closed position. When power is lost in the fly-by-wire system power to the solenoid 104 is also lost and the internal bias spring locks the sum bar 105 into position with the central axis of the pinion 109 aligned with the central axis of rotor 99. This locks the mechanical system into communication with the cockpit controls. The described system may be utilized to lock mechanical systems in phase to cockpit controls for any or all of the control surfaces and is not limited to the elevator control systems.

Figure 7:
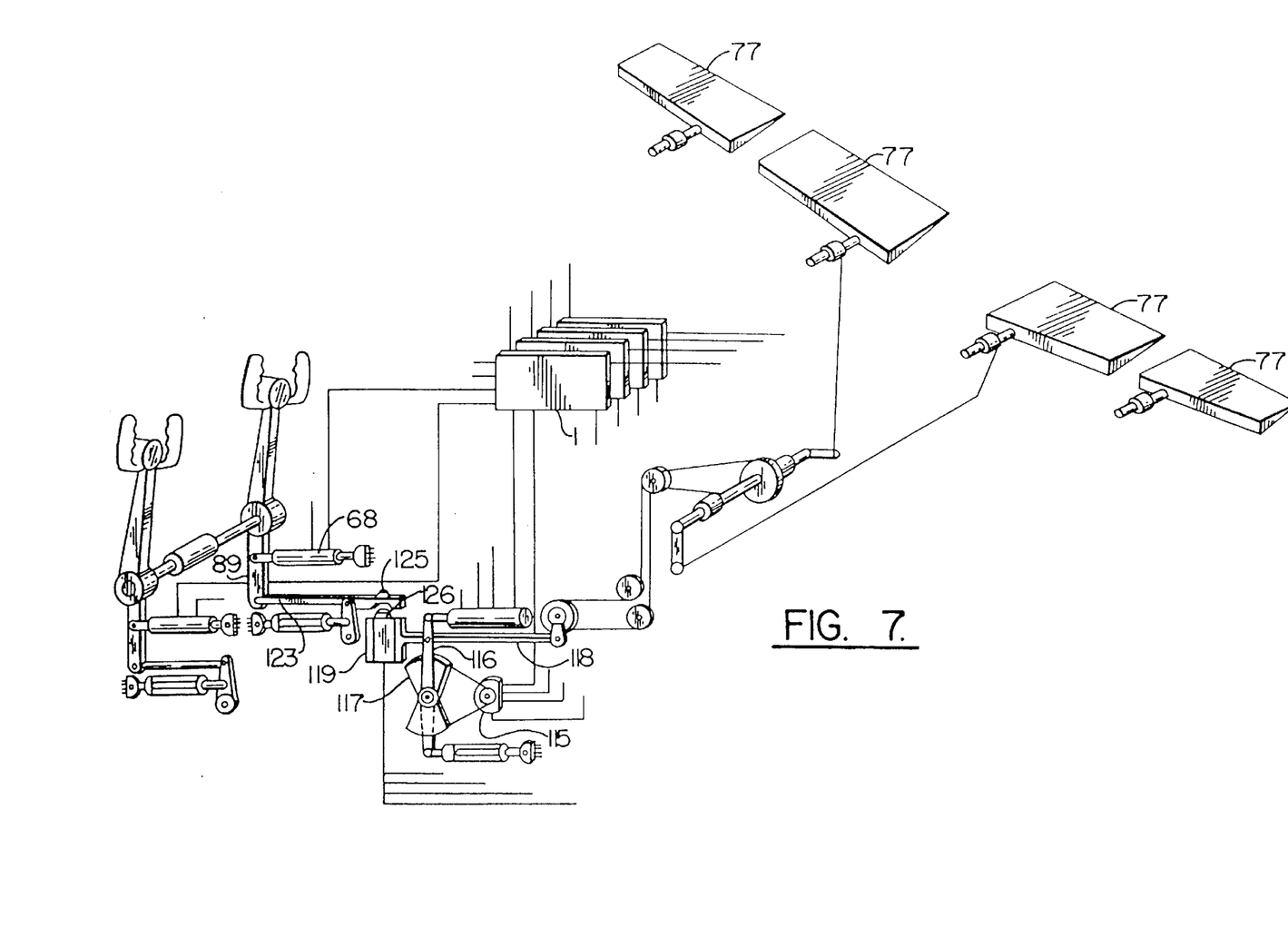
FIG. 7 is a schematic view of the pitch control system with a schematic of the alternative locking actuator in standby.

FIG. 7 shows an alternative embodiment of the engaging system. Instead of the locking cams set forth in the first embodiment, The EMA 115 has a crank arm 116 attached to a pulley section 117 driven by the EMA 115. A follower arm 118 is rotatably mounted to the end of the crank arm 116 at pivot point 121 opposite the connection to the rotor 117. The opposite end of the follower arm 118 is attached to a solenoid 119 shown in more detail in FIG. 8 which contains a pin 120 mounted on the plunger 122 of the solenoid 119. The follower arm 118 is rotatably engaged with the crank arm 116 such that rotation of the pulley section 117 translates to generally linear motion of the follower arm 118.

Figure 8:
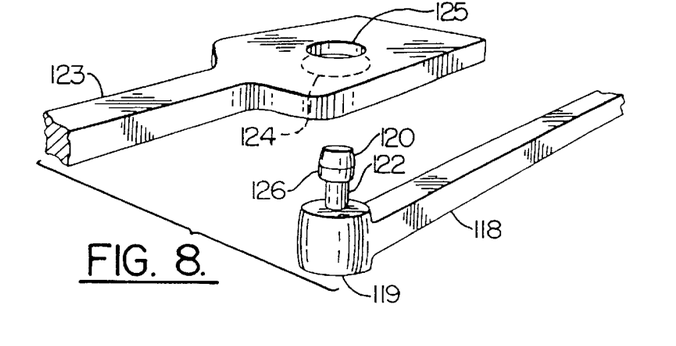
FIG. 8 is a detailed view of the alternative interlocking solenoid.

FIG. 8 shows the solenoid and follower arm 118 in more detail. The follower arm 118 is moved in synchronization with the signals received from the flight computers along with the cable system as described before.

The crank arms 89 of the pitch controls from the cockpit are rotatably attached to a connecting arm 123. Said connecting arm 123 has a recess 124 and a hole 125 for receiving the headpin 126 of the solenoid plunger 122. On loss of power or computer command, the internal spring of the solenoid will bias the pin 120 into the recess 124 and the headpin 126 engages the hole 125 to lock the follower arm 118 and the connecting rod 123 together thereby connecting the cockpit controls to the mechanical system. The interlocking mechanisms described herein are representative and many interlocking mechanisms will be readily apparent to those skilled in the art and this invention is not limited to the specific structure disclosed.

Figure 9:
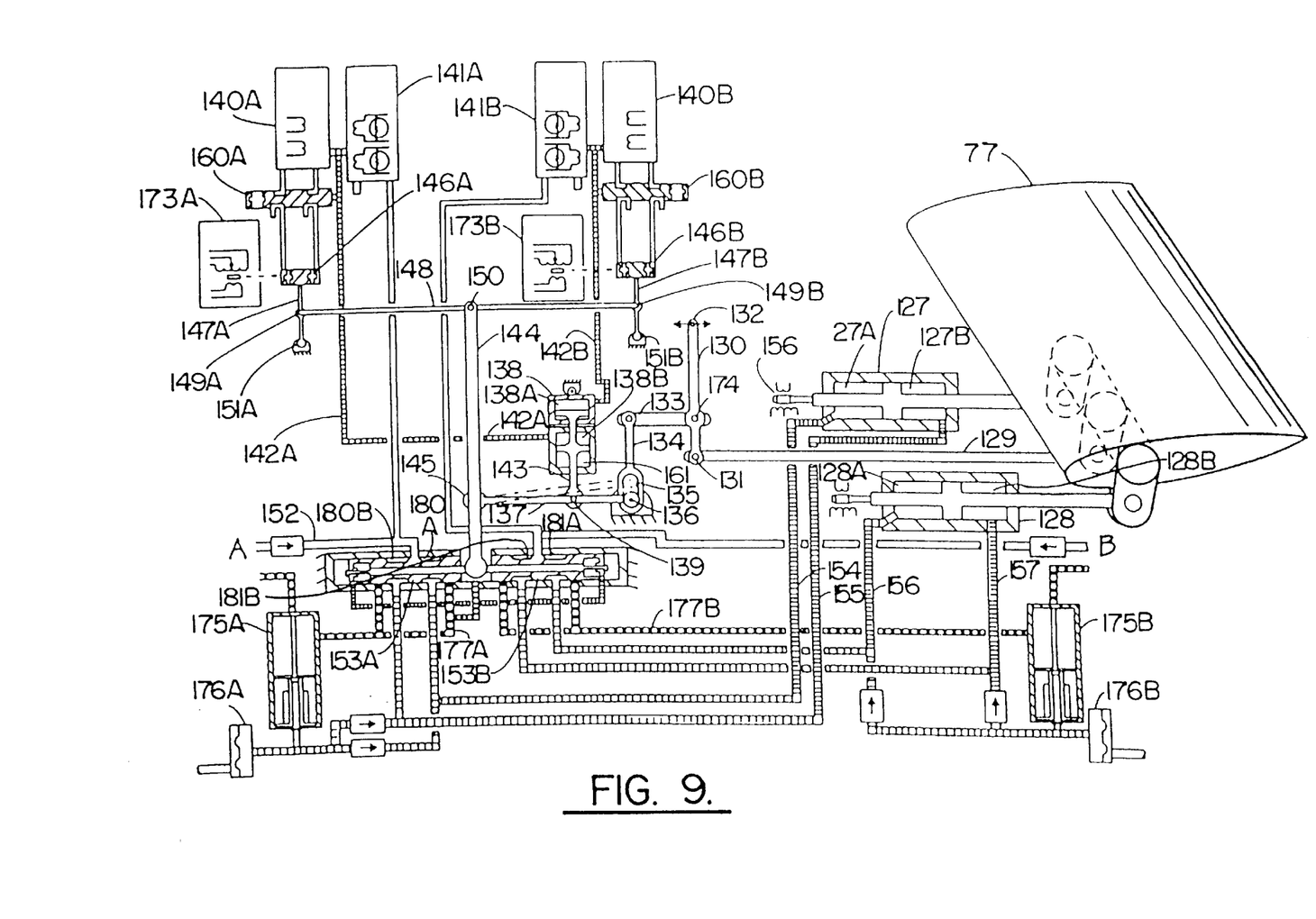
FIG. 9 is a schematic view of the control surface mechanical interlocking mechanism coupled to the hydraulic system.
Figure 10A:
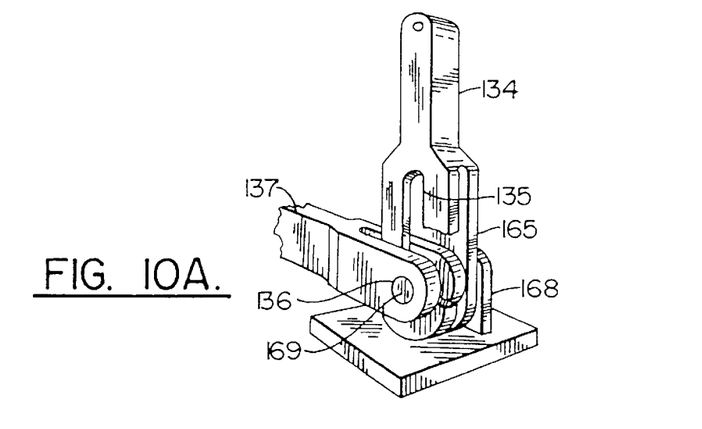
FIG. 10A & 10B are perspective views of the slotted link.
Figure 10B:
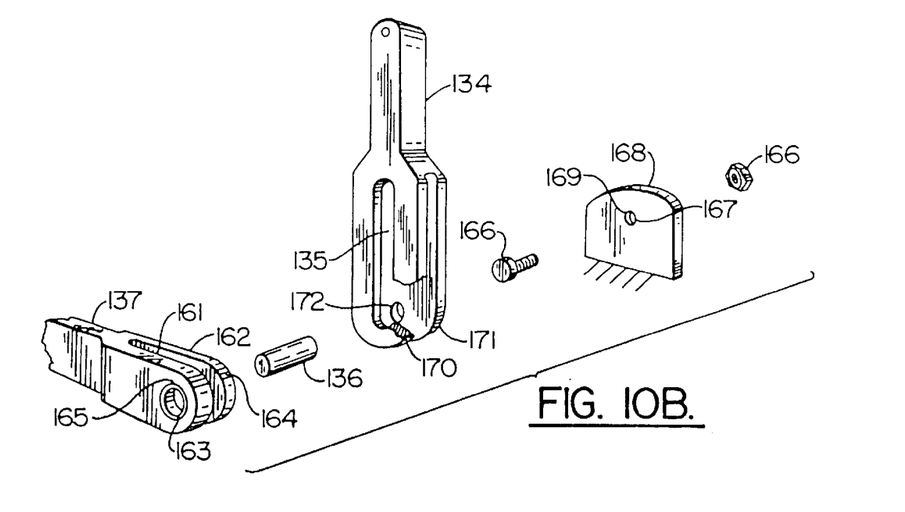

FIG. 9 shows the interconnection apparatus of a control surface for connection to the mechanical system on failure, in greater detail. The control surface, such as the elevator 77, for example, is shown with dual actuators 127 and 128. Disposed between the two actuators 127 and 128 is a feed back rod 129. Feed back rod 129 is connected to the control surface at a point displaced from the surface hinge line, so as the surface is rotated, feedback rod 129 is moved. A mechanical link 130 receives the mechanical control input from the cable system at its upper end at rotation point 132 and is rotatably connected at the other end to a pivot point 131 at the end of feedback rod 129 opposite the control surface 77 and rotates relative to the feedback rod 129 about pivot point 131. Motion of the control surface 77 causes point 131 to translate in response to the motion of the control surface 77. Further, mechanical link 130 is rotatably connected to a transverse link 133 at a pivot point 174 which permits the rotation of the link 130 about pivot point 174. Thus a mechanical input at point 132 to mechanical link 130 may be coupled to transverse link 133. Motion of either the control surface or the mechanical input from the cable system will cause transverse link 133 to translate in the transverse direction. The other end of transverse link 133 is rotatably connected to the upper section of a slotted link arm 134 which has a longitudinal slot 135 therein adapted for receiving a slot roller 136 as shown in FIGS. 10a and 10b. The opposite end of slotted link arm 135 is rotatably attached to the mechanical ground of the airframe at pivot point 169. Transverse motion of link 133 causes slotted link arm 134 to rotate about pivot point 169. A slotted link follower arm 137 which rotatably supports the slot roller 136 is coupled to the slot 135 of slotted link arm 134 such that the slot roller 136 may be moved from one end of said slot 135 to the other. A dual hydraulic piston 138 rotatably attached to mechanical ground has a piston rod 143 which rotatably engages the slotted link follower arm 137 at a pivot point 139 along its length.

When the fly-by-wire or autopilot (electrical) system is in operation the servo control valves 140A and 140B for hydraulic systems A and B respectively and the solenoid operated shut off valves 141A and 141B for hydraulic systems A and B respectively remain energized with pressure in at least one of the dual hydraulic piston chambers 138a or 138b of hydraulic cylinder 138 fed by hydraulic lines 142A and 142B respectively will retain pressure and the piston rod 139 of the hydraulic cylinder 138 will hold the slotted link follower arm 137 at the lower position of the slot 135. In this position, the axis of roller 136 of the slotted link follower arm 137 will be coaxial with the pivot point 169 and any motion of slotted link arm 134 about pivot point 169 will not affect the position of slotted link follower arm 137. Mechanical input to link 130 at point 132 is thereby permitted to idle with link 133 and slotted link arm 134.

Slotted link follower arm 137 is rotatably attached at its end opposite the slotted link arm 134 to a hydraulic input servo arm 144 at pivot point 145. Modulating pistons 146A and 146B are rotatably coupled to one end of control rods 147A and 147B which control rods are of equal length and rotatably attached to mechanical ground at pivot points 151A and 151B at the other end. The modulator pistons 146A and 146B are driven by computer 1 and actuate the control rods 147A and 147B. The electric system detects the position of the modulating pistons through LVDTs 173A and 173B which are coupled to the modulating pistons. An elongated transverse control rod 148 is rotatably attached at one end to control rod 147A and at the other to control rod 147B. Transverse control rod 148 is connected at pivot points 149A and 149B respectively each of which are located at points equidistant from the point of attachment to mechanical ground. The precise point of such connection is determined by the overall mechanical gain desired in the system. In addition, transverse control rod 148 is rotatably attached to hydraulic control rod 144 at one end at pivot point 150. Hydraulic control rod 144 is coupled to a dual hydraulic control valve 152 having dual redundant chambers which communicate with hydraulic systems A and B respectively.

While in the electronically signaled mode the pistons 146A and 146B move the ends of control rods 147A and 147B opposite the mechanical ground in a transverse direction. This motion causes translation of control rod 148 in the transverse direction and moves pivot point 150 in the transverse direction. Because slotted link follower arm 137 is in a downward position it effectively locks pivot point 145 in position thereby causing hydraulic control rod 144 to rotate about pivot point 145 and operates the dual chamber hydraulic control valve 152. When the hydraulic control rod 144 shifts the hydraulic control valve core to the left, hydraulic pressure from system A is coupled through chamber 180a to hydraulic cylinder 127 and hydraulic fluid enters chamber 127a through hydraulic line 154 and exits chamber 127b through hydraulic line 155 to return. This causes the piston and piston rod of hydraulic cylinder 127 to move the control surface as intended. When the hydraulic control rod 144 shifts the core of the hydraulic control valve to the right hydraulic pressure from system A is coupled through chamber 180b to the other side of hydraulic cylinder 127 and hydraulic fluid enters chamber 127b through hydraulic line 155 and exits chamber 127a through hydraulic line 154 to return. This causes the piston and piston rod of hydraulic cylinder 128 to move the control surface in the opposite direction. Similarly, when the hydraulic control rod 144 shifts the hydraulic control valve core to the left, hydraulic pressure from system B is coupled through chamber 181a to hydraulic cylinder 128 and hydraulic fluid enters chamber 128a through hydraulic line 156 and exits chamber 128b through hydraulic line 157 to return. This causes the piston and piston rod of hydraulic cylinder 128 to move the control surface as intended. When the hydraulic control rod 144 shifts the core of the hydraulic control valve to the right, hydraulic pressure from system B is coupled through chamber 181b to the other side of hydraulic cylinder 128 and hydraulic fluid enters chamber 128b through hydraulic line 157 and exits chamber 128a through hydraulic line 156 to return. This causes the piston and piston rod of hydraulic cylinder 128 to move the control surface in the opposite direction. Return lines 177A and 177B for the respective hydraulic systems along with compensators 175A and 175B and pressure transmitters 176A and 176B as is known in the hydraulic art are shown for completeness.

Accordingly, should one of the hydraulic systems fail the other can continue to operate the control surface.

When the electric signal system fails and electrical power is no longer applied to the solenoid operated shut-off valves 141A and 141B, hydraulic pressure from both system A and B is shut off from lines 142A and 142B. Pressure remaining in lines 142A and 142B is relieved through the return path through the shutoff valves 141A and 141B. This causes the hydraulic fluid in chambers 138a and 138b of the dual hydraulic piston 138 to be expelled by the action of a spring 161 and the piston rod 143 pulls the slotted link follower arm 137 up to the top of slot 135 (as shown by the dotted line). In addition, electrically controlled servo valves 140A and 140B are also shut off and modulating pistons 146A and 146B center and spring cage the control rods 147A and 147B into a fixed position. This positions pivot point 150 into a fixed position. When manual control is input to link 130 at point 132 the input translates linkage 133 and rotates slotted link bar 134 about pivot point 169 and the slotted link control rod follower bar 137 is up in the slot, positioned by loss of hydraulic power to hydraulic cylinder 138 and is now translated to the right or left as the case may be which causes the control bar 144 to rotate about pivot point 150. This causes the control bar 144 to move the core of the control valve 152 as before and the hydraulic actuators of the control surface move the control surface as set forth above. A feedback link 129 moves in response to movement of the control surface and shifts the pivot point 174 in the same direction as the translation of the feedback rod 133. This nulls out the manual input from the mechanical control system and turns off the hydraulic input to hydraulic actuators 127 and 128 to accurately position the control surface.

The bypass valves 160A and 160B provide a fluid run around path between the fluid cavities of the modulating pistons 146A and 146B, when operating with only one of the hydraulic systems, thereby permitting continued operation of the hydraulic system when either A or B fails or is otherwise out of service.

FIG. 10a and 10b show a particular embodiment of the slotted link 134 and its connection to the slotted link follower arm 137. With reference to FIG. 10b, the end of the slotted link follower arm 137 has a pair of arms 161 and 162 spaced apart each of which has a hole 163 and 164 respectively for receiving a roller 136. The slotted link 134 also has two arms 170 and 171. the first arm 170 is an elongated link which has an elongated slot 135 therein. The arms 161 and 162 are adapted for receiving arm 170 between arms 161 and 162. The roller 136 rotatably engages hole 163 and 164 in a conventional way through bearings 165 mounted in the arms 161 and 162 and the roller 136 engages the slot 135. The other arm 171 of slotted link 134 is a plate having a hole 172 adjacent the bottom of slot 135. The slotted link 134 is rotatably mounted through bearings or the like to a support 168 by a bolt and nut unit 166 through hole 172 at pivot point 169 and a hole 167 in the support 168. The support 168 is attached to mechanical ground 169.

In operation, as shown in FIG. 10a, slotted link follower arm rotatably engages the slot 135 of slotted link 134 at the bottom of said slot with the roller 136 coaxial with the bolt 166 which permits slotted link 134 to rotate independent of slotted link follower arm 137 at pivot point 169. When the slotted link follower arm is held at the top of the slot 135, slotted link 134 will still rotate about the pivot point 169 which is coaxial with bolt and nut unit 166 but will then cause translation of slotted link follower arm 137 as described above.

Much of the mechanical linkage is described in terms of schematic and particular structural mounting configurations as well known in the art and particular implementations and variations thereof will be readily apparent to those skilled in the art.

Figure 11:
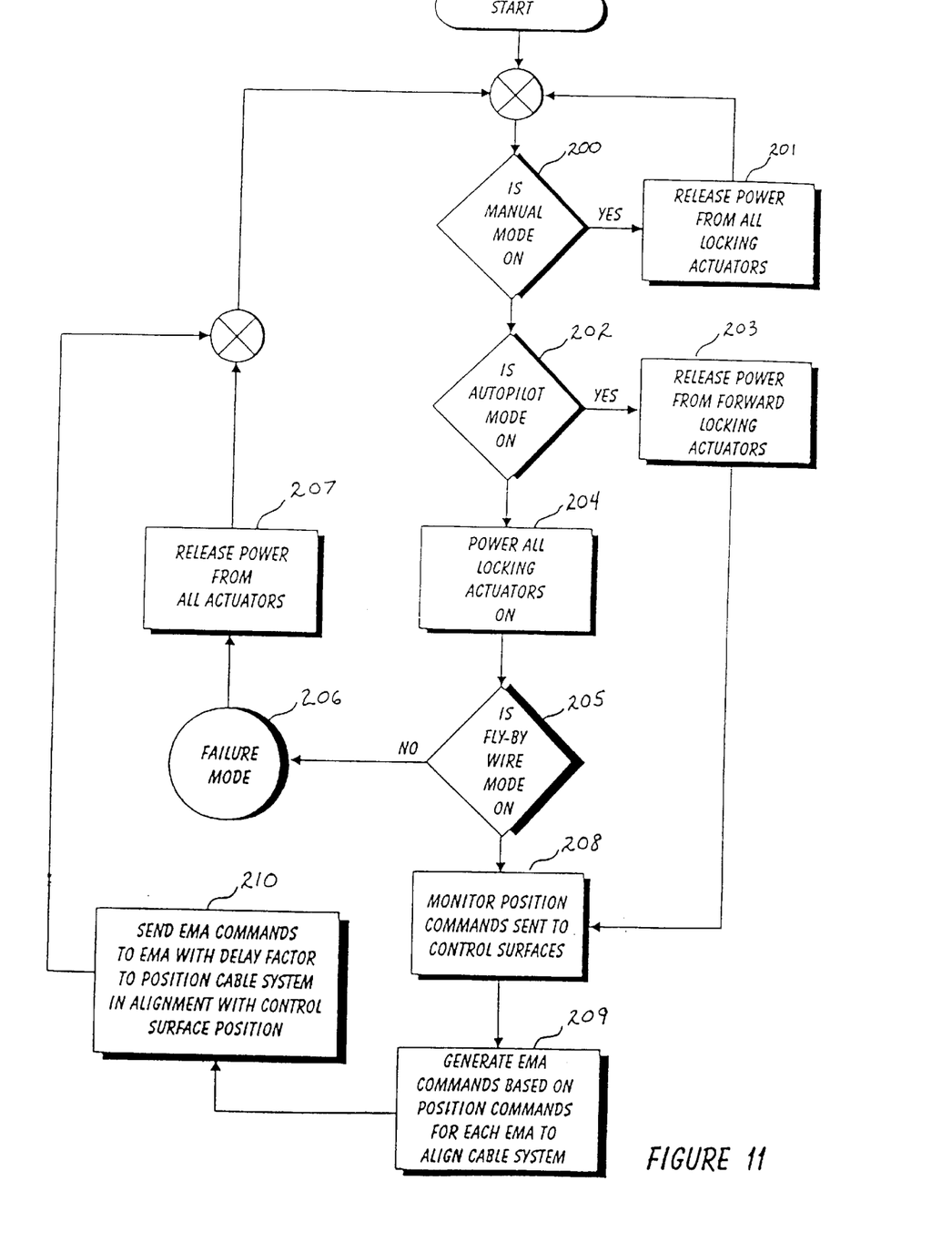
FIG. 11 is a flow chart of the control system.

FIG. 11 shows a flow chart of the system. In addition to normal flight control programming, the flight computer 1 includes a routine for management of the phase concurrence and interlock of the mechanical system to the flight controls. The computer checks to determine if the manual mode has been selected, step 200. If so, all power is released from the locking actuators and the mechanical system engaged, step 201. If not the computer 1 checks to determine if the autopilot mode is on, step 202, if so the power is released from the forward locking actuators and the EMA is engaged with the cockpit controls and visual cues are observed by movement of the pilot controls, step 203 and the computer 1 continues to operate and monitor the controls, step 208, 209, and 210. If not, then all power to the locking actuators remains on and the electrical control system operates the controls and maintains the in phase relationship of the mechanical system in response to pilot input, step 204. In the event that the electrical system fails, the computer 1 no longer operates and the system goes into failure mode step 206 and as a result all power is released from all actuators and the mechanical system is engaged, step 207. If the electrical system remains operational, the computer 1 monitors position commands sent to the control surfaces, step 208. EMA commands are generated based on position commands for each control surface EMA to align the cable system, step 209. EMA commands are sent to each EMA to position the mechanical system in phase with the control surface positions, step 210 and the routine is repeated at step 200.

Having thus described the invention, what is claimed is:

1. A mechanical back-up control system for mechanically coupling an operator control apparatus with moveable elements adapted to control positioning of a control member upon failure of an electrical control system which under normal operating conditions controls positioning of the control member in response to the operator control apparatus, said mechanical back-up control system comprising:

positioning apparatus which during normal operation of the electrical control system is responsive to control signals from the electrical control system to continuously maintain positioning of said moveable elements substantially in phase with said control member;

linkage which is positioned in response to positioning of said operator control apparatus and which is adapted to be coupled with said moveable elements; and a coupler for coupling said linkage with said movable elements upon failure of the electrical control system, the coupler under normal operating conditions permitting movement of said linkage without transmitting said movement to said movable elements.

2. A mechanical back-up control system as described in claim 1 wherein said positioning apparatus comprises:

a. an actuator adapted for receiving control signals from said electrical control system and positioning said moveable members substantially in phase with the movement of said control member.

3. A mechanical back-up control system as described in claim 2 wherein said actuator further comprises a clutch which is adapted to engage and disengage said actuator from said moveable elements in response to signals received from said electrical control system.

4. A mechanical back-up control system as described in claim 1 wherein said coupler comprises:

a. at least one locking actuator, b. locking apparatus responsive to said locking actuator adapted for releasably engaging and disengaging a portion of said linkage on activation or deactivation of said locking actuator.

5. A mechanical back-up control system as described in claim 1 wherein said positioning apparatus comprises a driving actuator having an axle coupled to said movable elements, and said coupler comprises mechanical linkage and a locking actuator which couples said mechanical linkage to the axle of said driving actuator upon failure of the electrical control system.

6. A mechanical back-up control system as described in claim 5 further comprising:

a. means for sensing the position of said control member and means for activating said driving actuator to position said moveable elements to a position substantially equal to the position said moveable elements would occupy if coupled to said operator control apparatus.

7. A mechanical back-up control system as described in claim 5 further comprising:

a. means for sensing the position of said control apparatus and means for activating said driving actuator to position said moveable elements to a position substantially equal to the position said moveable elements would occupy if coupled to said control apparatus.

8. A mechanical back-up control system as described in claim 5 further comprising:

a. means for sensing the position of said operator control apparatus and means for activating said driving actuator to position said moveable elements to a position substantially equal to the position said moveable elements would occupy if coupled to said operator control apparatus.

9. A mechanical back-up control system as described in claim 1 further comprising means for sensing the position of said control member.

10. A mechanical back-up control system as described in claim 9 wherein said sensing means comprises:

a sensor coupled to linkage driven by said control member which is adapted for generation of a feedback signal;

a computing device adapted for receiving the feedback signal and sending position information related to said feedback signal to said positioning apparatus said moveable elements; and means for activating said positioning apparatus in response to said sensed position of said control member.

11. A mechanical back-up control system as described in claim 9 wherein said positioning apparatus comprises:

a control module mechanically coupled to said control member and adapted to generate a feedback signal containing information describing the position of said control member and send the feedback signal to the electrical control system; and a driving actuator responsive to said electrical control system and mechanically coupled to said moveable elements.

12. A mechanical bypass control system as described in claim 1 wherein said control member comprises an aircraft control surface and wherein said control system further comprises a mechanical coupler coupled to at least one hydraulic actuator adapted for moving said aircraft control surface.

13. A mechanical bypass control system for bypassing a flight computer control system responsive to operator control which drives at least one control surface comprising:

a. means for positioning said control surface, adapted for changing position responsive to commands from said flight computer control system, b. mechanical linkage adapted for coupling operator control to said control surface, c. means for moving said mechanical linkage generally in phase with said positioning means in response to commands from said flight computer control system during normal operation thereof, and d. means for selectively engaging and disengaging said mechanical linkage with said control surface positioning means.

14. A mechanical bypass control system as described in claim 13 wherein said means for moving mechanical linkage comprises at least one actuator, for positioning said mechanical linkage, responsive to said flight control system commands.

15. A mechanical bypass control system as described in claim 14 further comprising:

a. means for sensing the position of said control surface, and b. means for activating said actuator to position said mechanical linkage to a position generally equal to the position said mechanical linkage would occupy if coupled to said positioning means.

16. A mechanical bypass control system as described in claim 13 wherein said flight control system is adapted to receive operator input and further comprises means for selectively engaging and disengaging said mechanical linkage with said positioning means.

17. A mechanical bypass control system as described in claim 13 wherein said engaging and disengaging means comprises:

a. a locking actuator, b. a link adapted to selectively couple said mechanical linkage to said operator input on activation or deactivation of said locking actuator.

18. A mechanical bypass control system as described in claim 17 wherein said positioning means comprises:

a. a control module responsive to said flight computer adapted for generating a feedback signal indicating position of said control surface;

b. an actuator activated by said control module attached to said control surface for positioning said control surface.

19. A mechanical bypass control system as described in claim 14 wherein said means for sensing comprises:

a. a control module coupled to said control surface which is adapted for generation of a feedback signal.

20. A mechanical bypass control system as described in claim 14 wherein said moveable element comprises an aircraft control surface and said moveable element actuator comprises a hydraulic actuator adapted for moving said aircraft control surface.

21. A mechanical bypass control system having mechanical linkage for bypassing an electrical control system activated by cockpit controls which controls at least one moveable control surface comprising:

a. at least one control surface actuator coupled to actuator control apparatus responsive to said electrical control system for positioning said control surface which control surface is adapted for changing position;

b. at least one linkage actuator responsive to said electrical control system coupled to said mechanical linkage and adapted to move said mechanical linkage generally in phase with the position of said control surface during normal operation of the electrical control system;

c. at least one locking apparatus for selectively engaging and disengaging said mechanical linkage with said cockpit controls; and d. at least one interlock apparatus for selectively coupling said mechanical linkage to said control surface actuator on failure of said electrical control system.

22. A mechanical bypass control system as described in claim 21 wherein said interlock apparatus further comprises:

a. an input link coupled to said control surface and adapted for movement in response to a mechanical feedback signal and a mechanical input signal; and b. a translating arm adapted for selective coupling and uncoupling to said input link.

23. A mechanical bypass control system as described in claim 22 wherein said interlock apparatus further comprises:

a. a translational link rotatably attached to said input link at one end and adapted for translational motion on receipt of either a mechanical input signal, a mechanical feedback signal or both;

b. a slotted link rotatably attached to mechanical ground at one end and rotatably attached to said translational link at the other end having a longitudinal slot therein; and c. a longitudinal arm coupled to said control surface actuator control apparatus;

d. a roller adjustably received by the longitudinal slot of said slotted link and rotatably mounted on said longitudinal arm.

24. A mechanical bypass control system as described in claim 23 wherein said interlock apparatus further comprises:

a. at least one hydraulic actuator coupled to a control surface; and b. at least one hydraulic control valve coupled to said longitudinal arm adapted to couple hydraulic fluid to said hydraulic actuator when said longitudinal arm moves.

25. A mechanical bypass control system as described in claim 24 including means for nulling said mechanical input signal.

* * * * *